MAGNETIC MEMORY EMPLOYING ANISOTROPY

Filed April 25, 1963 2 Sheets-Sheet 1

INVENTORS
Roy H. Cornely &
Walter F. Kosonocky

BY Carl V. Olson
Attorney

July 5, 1966 R. H. CORNELY ET AL 3,259,888

MAGNETIC MEMORY EMPLOYING ANISOTROPY

Filed April 25, 1963 2 Sheets-Sheet 2

INVENTORS
Roy H. Cornely &
Walter F. Kosonocky
By Carl V. Olson
Attorney

United States Patent Office 3,259,888

Patented July 5, 1966

3,259,888
MAGNETIC MEMORY EMPLOYING ANISOTROPY

Roy H. Cornely, Monmouth Junction, and Walter F. Kosonocky, Iselin, N.J., assignors to Radio Corporation of America, a corporation of Delaware Filed Apr. 25, 1963, Ser. No. 275,680
15 Claims. (Cl. 340—174)

This invention relates to anisotropic magnetic elements, and arrays of such elements, for providing storage of digital information or for performing logical functions.

Anisotropic magnetic materials are those which have a preferred or easy direction of magnetic flux to which a remanent flux prefers, or returns to, in the absence of a contrary magnetizing force such as that produced by a current through a conductor adjacent to or embedded in the magnetic material. Remanent flux in an anisotropic magnetic material prefers to assume a direction pointing one way or the opposite way along the easy axis. Anisotropic magnetic materials are commonly employed in thin film memories wherein the anisotropic magnetic material consists of evaporated spots created by evaporation in the presence of magnetic field. The thin film spots are evaporated with a diameter of a few milli-inches and a thickness of about a few thousand Angstroms. The thin film spot has an easy axis in the plane of the spot and has a hard axis, also in the plane of the spot, at right angles to the easy axis. Magnetization of the thin film spot in one direction along the easy axis is used to store a "1" information bit, and magnetization in the opposite direction along the easy axis is used to store a "0" information bit.

Conductors for addressing the thin film spot memory element are located on one or both flat sides of the spot. The return path for flux along the easy axis in the thin film spot is through the air or other insulating material on both sides of the spot. A thin film magnetic spot operates satisfactorily without a magnetic return path through a magnetic material when the spot is made thinner than its diameter by a factor of about ten thousand. While thin film memories have been shown to operate satisfactorily, they are undesirably characterized in providing relatively small output sense signals, in requiring relatively large drive currents, and in having relatively large disturbing transients which limit the speed at which a read-write cycle can be performed.

It is an object of this invention to provide an improved magnetic element for the storage of digital information which is characterized in improved characteristics as regards drive currents, output sense signals, and speed of operation.

It is another object to provide an improved magnetic element, and arrays of such elements, which include a magnetic body at least a part of which is anisotropic and wherein a magnetic return path is provided within a magnetic material which may be anisotropic or isotropic.

According to an example of the invention, a magnetic element, such as a memory element, includes two crossed conductors electrically insulated from each other and surrounded, at least at the crossover, by a body of magnetic material which includes at least a part which is anisotropic with an easy direction of magnetization and a relatively hard direction of magnetization. The part of the magnetic body which is anisotropic is located and oriented so that it is common to a closed loop magnetic flux path which surrounds one conductor and a closed loop magnetic flux path which surrounds the other conductor. The part of the magnetic body which is anisotropic may have an easy "axis" or direction of magnetization in closed circles surrounding one of the conductors. Such a condition of anisotropy can be induced by passing a current through the conductor and simultaneously heating and then cooling the magnetic material.

Alternatively, the part of the magnetic body which is anisotropic may be constituted by a layer of magnetic material having an easy axis along straight parallel lines extending through the layer. Such a layer of anisotropic magnetic material may have crystalline anisotropy constructed appropriately slicing a grown single crystal of magnetic material, or may have induced anisotropy created by heating and cooling a layer of magnetic material in the presence of an appropriate external magnetic field. Return paths for magnetic flux in the anisotropic layer are provided by an adjacent layer or layers which may be of isotropic magnetic material.

Referring now to the drawings.

Figure 1:
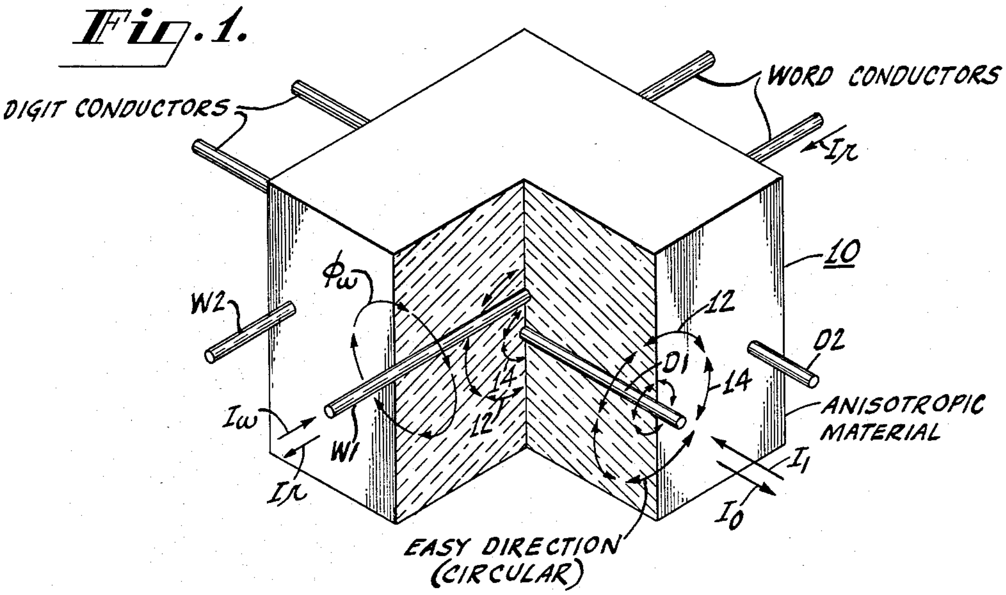
FIG. 1 is an isometric view of a magnetic element constructed according to the teachings of the invention and being partially cut away to illustrate interior construction details.

Referring now in greater detail to FIG. 1 there is shown a magnetic element including a digit or digit-sense conductor D1, and a word conductor W1 arranged in crossed and insulating relationship with respect to the digit conductor D1. A body 10 of magnetic material, which is cut away in the drawing to reveal interior details, surrounds the conductors D1 and W1, at least in the vicinity of the crossover of the conductors. The body 10 of magnetic material is constructed of a magnetic material, such as a ferrite, having an appropriate composition which permits its being rendered anisotropic. If a ferrite is used, the conductors need only be insulated or spaced from each other and not from the magnetic material, because of the insulating properties of the ferrite material. The body 10 of magnetic material is made to possess anisotropy with easy directions of magnetization in closed loop circles 12 and 14 about the digit conductor D1 by a magnetic annealing process in which a current is passed through the conductor to produce a circular magnetic field while the magnetic body 10 is heated and then cooled.

The magnetic annealing process of producing an induced magnetic anisotropy is accomplished by heating and cooling an appropriate magnetic material in the presence of a magnetic field. After cooling, the material has a magnetic anisotropy with an easy axis or a preferred direction of magnetization in the direction of the applied field, and also in the opposite direction. The material is heated to a temperature below its Curie temperature. The material must be one having ions which migrate to sites in the molecular structure at the temperature, below the Curie temperature, to which the material is raised. After the material has cooled, the ions remain frozen in the structure and they remain in the frozen positions after the magnetic field is removed. The material thus retains the anisotropy established at the high temperature by the external magnetic field. The strength of the induced anisotropy is a function of the composition of the material, the annealing temperature, the length of time the annealing temperature is maintained, the rate at which the annealing temperature is quenched, and the strength of the external magnetic field. Various ferrite compositions constitute suitable magnetic materials in which anisotropy can be induced.

More detailed information on suitable materials and methods of producing induced anisotropy may be found in: J. Smit and H. P. J. Wyjn, Ferrites, John Wiley and Sons (1950). The establishment of induced anisotropy in two nickel ferrite compositions is described in the following publications: R. Wagner, Annalen Der Physik, vol. 7, p. 302 (1961) and R. Wagner, Zeitschrift für Angewandte Physik, vol. 13, p. 187 (1961). Similar results employing cobalt substituted ferrites are described in the following two publications: R. F. Penoyer and L. R. Bickford, Jr., Phys. Rev., vol. 108, pp. 271–277 (1957) and Bozorth, Tilden, and Williams, Phys. Rev., vol. 99, p. 1788 (1955). Zinc nickel ferrites and manganese ferrites are also useful materials in which anisotropy can be induced. Ferrites constitute a magnetic material having the desirable characteristics of being electrical insulators so that conductors embedded therein need not be electrically insulated from the magnetic material. The book, R. M. Bozorth, Ferromagnetism, D. Van Nostrand, Inc. (1955), describes inducing anisotropy in permalloy at page 117, and in perminvar at page 171. A material composition selected for use should have an inherent magnetocrystalline anisotropy which is significantly less than the superimposed induced anisotropy.

In FIG. 1, the magnetic body 10 is shown as including an additional digit conductor D2 and an additional word conductor W2 for the purpose of illustrating the fact that a single body 10 of magnetic material may be employed with an array of conductors to provide an array of magnetic elements with one magnetic element at each crossover of a digit conductor and a word conductor. The body 10 may be a ferrite constructed with imbedded conductors by a "doctor blade" technique. On the other hand, individual magnetic bodies may be located at each crossover of a digit conductor and a word conductor. Each magnetic body may be formed at a crossover by molding, by evaporation through a mask, or by any other suitable method.

Figure 2:
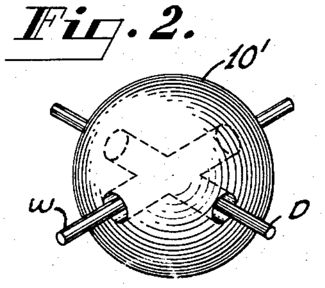
FIG. 2 is a magnetic element having a spherical outside surface.
Figure 3:
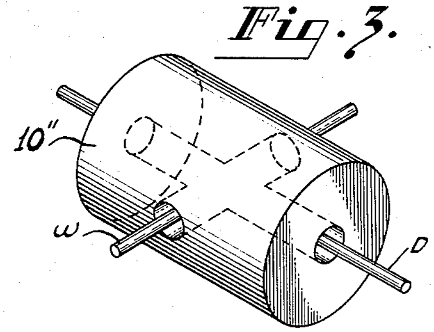
FIG. 3 is a magnetic element having a cylindrical outside surface.
Figures 4, 5:
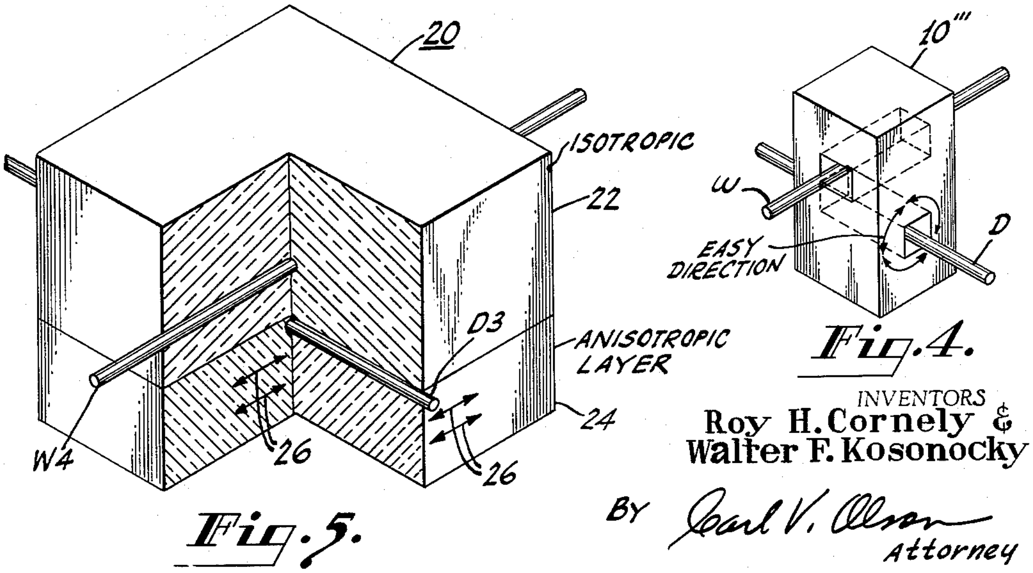
FIG. 4 is a magnetic element having an outside surface in the form of a cube or a square prism.
FIG. 5 is an isometric view of a magnetic element wherein the magnetic body includes an isotropic layer and an anisotropic layer.

FIGS. 2, 3 and 4 illustrate magnetic elements wherein individual preformed magnetic bodies 10′, 10″ and 10‴ have alternative exterior geometrical surfaces.

Reference will now be made to FIG. 1 for a description of the operation of the magnetic memory element formed by the crossover of the conductors D1 and W1, and the magnetic material of the body 10 surrounding the crossover of the two named conductors. The body 10 of magnetic material has induced anisotropy with easy directions of magnetization in circles about the digit conductor D1. Remanent flux in the body 10 near the conductor D1 tends to assume closed path loops in a clockwise direction or a counterclockwise direction around the conductor D1. The larger ones of these loops are designated 12, and smaller ones are designated 14.

It is important in the operation of the magnetic element that an anisotropic part of the body 10 be common to closed loop flux paths surrounding the digit conductor D1 and closed loop flux paths surrounding the word conductor W1. The anisotropic part of the body 10 surrounds both conductors at the crossover in the path of loop 12, and also exists between the conductors at the crossover in the path of loop 14. If the conductors are disposed relatively closer together at the crossover, primarily the anisotropic material surrounding both conductors at the crossover may be used for the storage of information. Alternatively, if the conductors are disposed relatively further apart, primarily the anisotropic material between the conductors at the crossover may be employed for the storage of information.

When it is desired to store a bit of information in the memory element at the crossover of the conductors D1 and W1, a write current pulse in the direction $I_w$ is applied to the word conductor W1. This causes flux around the conductor W1 in the direction represented as $\phi_W$. During the presence of the write pulse $I_w$, a digit current pulse in the direction $I_1$ is applied through the digit conductor D1 if it is desired to store a "1," and a digit current pulse in the direction $I_0$ is applied through the conductor D1 if it is desired to store a "0." The first-applied word current $I_w$ tends to switch the flux at the crossover into the hard direction in a plane parallel to the plane of flux loop $\phi_W$. The later, but concurrently applied, digit current pulse tends to cause flux at the crossover to assume a clockwise or a counterclockwise direction in the plane of loops 12 and 14. At the crossover, the two magnetizing forces cause a resultant flux in circles lying in one diagonal plane or the other diagonal plane depending on the polarity of the digit current pulse.

The write current pulse $I_w$ is terminated prior to termination of the digit current pulse $I_1$ or $I_0$. The direction of the digit current then determines whether the remanent flux at the crossover returns to and remains in a clockwise or counterclockwise direction around the digit conductor D1. After the termination of the digit pulse, the remanent flux remains in the direction in which it was set around the easy axis loops 12 and 14. The amplitude of the digit pulse is merely large enough, when applied concurrently with a word pulse, to determine which one of the easy directions the flux will switch to. The amplitude of the digit pulse is not sufficient to change the direction of the flux at the crossover of the digit conductor D1 with another word conductor, W2, in the absence of a write current applied to the word conductor W2.

When it is desired to read out the information stored, a read pulse in the direction $I_r$ is applied through the word conductor W1. This causes the flux in the vicinity of the crossover to switch to its hard direction. In the process of switching some of the flux cuts the digit conductor D1 and induces a sense signal therein having a polarity indicative of whether the information bit stored was a "1" or a "0." A sense signal is also induced on digit conductor D2 indicative of the information stored at the crossover of digit conductor D2 and word conductor W1. At the termination of the read pulse $I_r$, the flux at the crossover returns to a clockwise or counterclockwise easy-axis direction around the digit conductor D1. The flux can be made to always return to the direction indicative of the storage of a "0" by introducing a dissymmetry such as by arranging the digit and word conductors at an appropriate angle somewhat different from 90° relative to each other, or by employing a direct-current bias on the digit conductor.

FIG. 5 illustrates a magnetic element which differs from the element shown in FIG. 1 in that the magnetic body 20 is constructed of two magnetic layers 22 and 24. The layer 22 may be of isotropic material such as a ferrite having relatively high permeability, relatively low coercive force and low remanent magnetization. The layer 24 is a layer of anisotropic material having an easy axis in the direction 26. The two layers 22 and 24 may be assembled together after the contacting surfaces have been ground and polished smooth to minimize the air gap between the two layers. Alternatively, the isotropic layer 22 may be deposited or molded on the layer 24. The conductors D3 and W4 may be imbedded in the isotropic layer 22 by any suitable method such as by molding the magnetic material of layer 22 around the conductors. Alternatively, the conductors D3 and W4 may be wires or printed circuit conductors laid in slots milled in one or the other, or both, of the layers 22 and 24.

The anisotropic layer 24 may have an induced anisotropy created by heating and cooling a magnetic material in the presence of an external magnetic field, as has been described. Alternatively, the anisotropic layer 24 may be a layer having crystalline or magnetocrystalline anisotropy, as a result of being a single crystal. The layer may be a slice taken along an appropriate plane of a grown single crystal. A grown single crystal, of zinc nickel ferrite, for example, has anisotropy with an easy axis in a certain direction related to the crystal lattice of the material. More detailed information on crystalline anisotropy in various materials is given in the book: J. Smit and H. P. J. Wyjn, Ferrites, John Wiley and Sons (1950), at pages 46, 116 and 163 through 166. According to a third alternative, the layer 24 may have an anisotropy created as the result of rolling the material into a sheet.

The operation of the magnetic element of FIG. 5 is as has been described in connection with the magnetic element of FIG. 1, the difference being that in the magnetic element of FIG. 5 the position of the magnetic body 24 which is anisotropic is located solely beneath the cross-over of the conductors D3 and W4. The anisotropic layer 24 constitutes an anisotropic part of the body 20 which is located so that it is common to closed loop magnetic flux paths which surround both conductors D3 and W4 at the crossover. Closed loop magnetic flux paths surrounding conductors D3 and W4 have a common portion in the anisotropic layer 24 and a return path through the isotropic layer 22.

Figure 6:
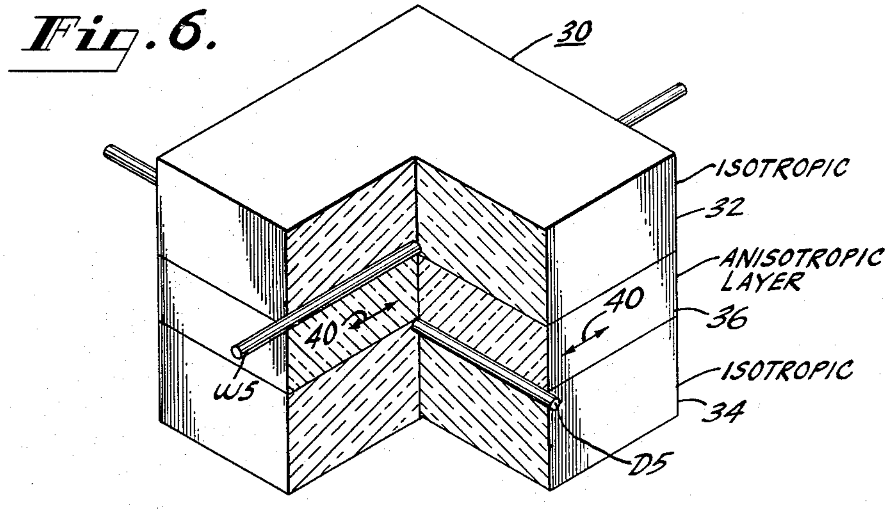
FIG. 6 is an isometric view illustrating a magnetic element having two isotropic layers and an intermediate anisotropic layer.

FIG. 6 illustrates another form of the invention wherein the body 30 of magnetic material includes two isotropic layers 32 and 34 and an intermediate anisotropic layer 36. Conductor W5 is located in the isotropic layer 32 and conductor D5 is located in the isotropic layer 34. The anisotropic layer 36 is located between the conductors W5 and D5 and is characterized in having an easy axis of magnetization in the direction represented 40. The conductors W5 and D5 may be located in the respective top and bottom surfaces of anisotropic layer 36.

The operation of the magnetic element of FIG. 6 is as has been described in connection with the magnetic element of FIG. 1 with the difference merely that the anisotropic portion of the body relied upon for the storage of information is located between the conductors W5 and D5. Isotropic layers 32 and 34 provide return paths within magnetic material for flux existing in anisotropic layer 36.

Figure 7:
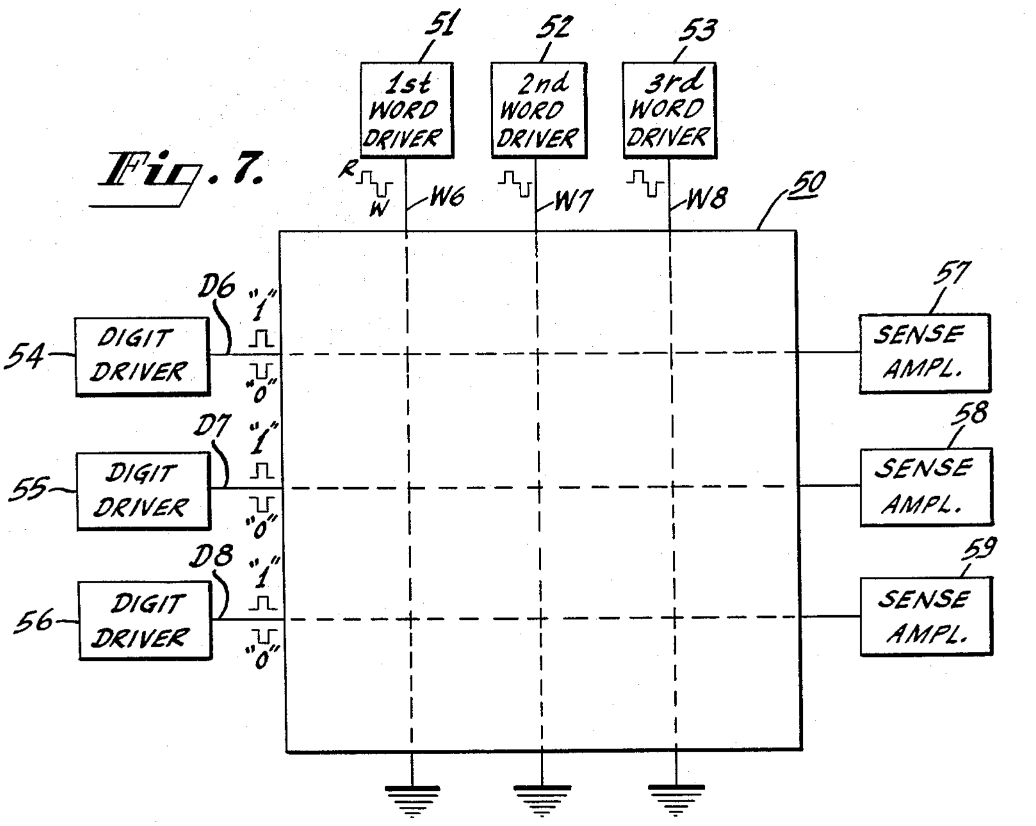
FIG. 7 is a schematic diagram illustrating a memory array for the storage of three words of digital information each including three digits or bits.

FIG. 7 is a diagrammatic representation of an array of memory elements formed in a magnetic body 50 at the crossovers of word conductors W6, W7 and W8 and digit-sense conductors D6, D7 and D8. Word drivers 51, 52 and 53 are connected to supply read and write pulses to respective ones of the word conductors. Digit drivers 54, 55 and 56 are connected to respective ones of digit conductors D6, D7 and D8 to supply digit pulses of appropriate polarity for the writing of "1" or "0" information digits in memory elements along an energized word conductor. Sense amplifiers 57, 58 and 59 are also connected to the digit-sense lines D6, D7 and D8 respectively, for sensing the information digits stored along an energized word conductor.

The memory array of FIG. 7 may have a single magnetic body 50 in which all of the conductors are embedded, or, alternatively, individual magnetic bodies may be located at such cross-over of a word conductor and a digit conductor. According to a further embodiment a single body 50 may be employed with slots or holes cut therein to confine the flux in the vicinity of each crossover and to prevent it from spreading to the vicinity of another crossover of a word conductor and digit conductor.

In all cases, the magnetic body has a portion at each crossover which is anisotropic and which is common to closed loop magnetic flux paths linking the word and digit conductors, all of the closed loop flux paths being completed within magnetic material.

What is claimed is:

1. A magnetic element comprising
two crossed conductors, and
a body of magnetic material surrounding said conductors and providing closed loop magnetic flux paths surrounding the conductors, said body of magnetic material being characterized in having at least a part which is anisotropic and which is located so that it is common to a closed loop magnetic flux path which surrounds one conductor and a closed loop magnetic flux path which surrounds the other conductor.

2. The combination as defined in claim 1 wherein the part of said magnetic body which is anisotropic extends completely around one of said conductors.

3. A magnetic element comprising
two crossed conductors, and
a body of magnetic material surrounding said conductors and providing closed loop magnetic flux paths surrounding the conductors,
said body of magnetic material being characterized in having at least a part which is anisotropic and which is located so that it is common to a closed loop magnetic flux path which surrounds one conductor and a closed loop magnetic flux path which surrounds the other conductor,
said part which is anisotropic being oriented so that it has a relatively easy direction of magnetization in the direction of a flux due to current in one of said conductors and so that it has relatively hard direction of magnetization in the direction of a flux due to current in the other one of said conductors.

4. A memory element comprising
a word conductor and a digit conductor arranged in crossed relation therewith, and
a body of magnetic material surrounding said conductors and providing closed loop magnetic flux paths surrounding the conductors,
said body of magnetic material being characterized in having at least a part which is anisotropic and which is located so that it is common to a closed loop magnetic flux path which surrounds one conductor and a closed loop magnetic flux path which surrounds the other conductor,
said part which is anisotropic being oriented so that it has a relatively easy direction of magnetization in the direction of a flux due to current in said digit conductor and so that it has relatively hard direction of magnetization in the direction of a flux due to current in said word conductor.

5. A magnetic element comprising
two crossed conductors, and
a body of magnetic material surrounding said conductors and providing closed loop magnetic flux paths surrounding the conductors,
said body of magnetic material being characterized in including a layer which is anisotropic and which is located between said conductors so that it is common to a closed loop magnetic flux path which surrounds one conductor and a closed loop flux path which surrounds the other conductor,
the remainder of said body of magnetic material being isotropic.

6. A magnetic element comprising
two crossed conductors, and
a body of magnetic material surrounding said conductors and providing closed loop magnetic flux paths surrounding the conductors,
said body of magnetic material being characterized in including a single-crystal layer which is anisotropic and which is located between said conductors so that it is common to a closed loop magnetic flux path which surrounds one conductor and a closed loop magnetic flux path which surrounds the other conductor.

7. A magnetic element comprising
two crossed conductors, and
a body of magnetic material surrounding said conductors and providing closed loop magnetic flux paths surrounding the conductors, said body of magnetic material being characterized in including a layer which is anisotropic and which is located between said conductors so that it is common to a closed loop magnetic flux path which surrounds one conductor and a closed loop magnetic flux path which surrounds the other conductor, the remainder of said body of magnetic material being isotropic,
said layer which is anisotropic being oriented so that it has a relatively easy direction of magnetization in the direction of a flux due to current in one of said conductors and so that it has relatively hard direction of magnetization in the direction of a flux due to current in the other one of said conductors.

8. A memory element comprising
a word conductor and a digit conductor in crossed relation therewith, and
a body of magnetic material surrounding said conductors and providing closed loop magnetic flux paths surrounding the conductors,
said body of magnetic material being characterized in including a single-crystal anisotropic layer which is located between said conductors so that it is common to a closed loop magnetic flux path which surrounds one conductor and a closed loop magnetic flux path which surrounds the other conductor, the remainder of said body of magnetic material being isotropic,
said anisotropic layer being oriented so that it has a relatively easy direction of magnetization in the direction of a flux due to current in said digit conductor and so that it has relatively hard direction of magnetization in the direction of a flux due to current in said word conductor.

9. A magnetic element comprising
two crossed conductors, and
a body of magnetic material surrounding said conductors and providing closed loop magnetic paths surrounding both conductors,
said body of magnetic material being characterized in including a layer which is anisotropic and which is located on one side of said conductors so that it is common to closed loop magnetic flux paths which surround both conductors, the remainder of said body of magnetic material being isotropic.

10. A magnetic element comprising
two crossed conductors, and
a body of magnetic material surrounding said conductors and providing closed loop magnetic paths surrounding both conductors,
said body of magnetic material being characterized in including a single-crystal anisotropic layer which is located on one side of said conductors so that it is common to closed loop magnetic flux paths which surround both conductors.

11. A memory element comprising
two crossed conductors, and
a body of magnetic material surrounding said conductors and providing closed loop magnetic paths surrounding both conductors,
said body of magnetic material being characterized in including an anisotropic layer which is located on one side of said conductors so that it is common to closed loop magnetic flux paths which surround both conductors, the remainder of said body of magnetic material being isotropic,
said anisotropic layer being oriented so that it has a relatively easy direction of magnetization in the direction of a flux due to current in one of said conductors and so that it has relatively hard direction of magnetization in the direction of a flux due to current in the other one of said conductors.

12. A memory array comprising
a plurality of row word conductors and a plurality of column digit conductors in crossed relation with the column word conductors, and
a body of magnetic material surrounding said conductors at each crossover of a column digit conductor and a row word conductor to form a memory element, each memory element including a single-crystal anisotropic layer which is located between said conductors so that it is common to a closed loop magnetic flux path which surrounds one conductor and a closed loop flux path which surrounds the other conductor, the remainder of said body of magnetic material being anisotropic.

13. A memory array comprising
a plurality of row word conductors and a plurality of column digit conductors in crossed relation with the column word conductors, and
a body of magnetic material surrounding said conductors at each crossover of a column digit conductor and a row word conductor to form a memory element, each memory element including a single-crystal anisotropic layer which is located on one side of said conductors so that it is common to closed loop magnetic flux paths which surround both conductors.

14. A memory array comprising
a plurality of row word conductors and a plurality of column digit conductors in crossed relation with the row word conductors, and
a body of magnetic material surrounding said conductors to form a memory element at each crossover of a column digit conductor and a row word conductor, said body of magnetic material providing closed loop magnetic flux paths surrounding the conductors and the crossovers of the conductors, said body of magnetic material being characterized in being anisotropic in at least part of all of said closed loop magnetic flux paths surrounding said conductors.

15. A memory array comprising
a plurality of row word conductors and a plurality of column digit conductors in crossed relation with the row word conductors, and
a body of magnetic material surrounding said conductors to form a memory element at each crossover of a row word conductor and a column digit conductor, said body of magnetic material being characterized in being anisotropic with a relatively easy direction of magnetization in at least part of closed loop magnetic flux paths surrounding each column digit conductor and with a relatively hard direction of magnetization in at least part of closed loop magnetic flux paths surrounding each row word conductor, said closed loop magnetic flux paths being entirely within said body of magnetic material.

References Cited by the Examiner

UNITED STATES PATENTS 2,997,695 8/1961 Conger et al. ________ 340—174

OTHER REFERENCES

Pages 28–31, August 5, 1959, Device Uses Orthogonal Magnetic Fields for Nondestructive Readout In Electronic Design.

BERNARD KONICK, *Primary Examiner.*

IRVING L. SRAGOW, *Examiner.*

H. D. VOLK, *Assistant Examiner.*